United States Patent

Satake et al.

Patent Number: 6,094,994
Date of Patent: Aug. 1, 2000

[54] IMPACT TYPE FLOW METER WITH TROUGH-LIKE MATERIAL SUPPLY DEVICE HAVING A BUILT IN SUPPLY OPENING

[75] Inventors: Satoru Satake, Tokyo; Hiroki Maeda, Hiroshima-ken, both of Japan

[73] Assignee: Satake Corporation, Tokyo, Japan

[21] Appl. No.: 08/995,250

[22] Filed: Dec. 19, 1997

[30] Foreign Application Priority Data

Dec. 26, 1996 [JP] Japan .................................... 8-357999

[51] Int. Cl.$^7$ ................................ G01F 1/30; B67D 5/08
[52] U.S. Cl. .......................................... 73/861.73; 222/55
[58] Field of Search ........................... 73/861.71, 861.73, 73/861.74; 222/55, 56

[56] References Cited

U.S. PATENT DOCUMENTS

| 1,506,936 | 9/1924 | Lea ........................................ 73/861.73 |
| 3,611,803 | 10/1971 | Kakira ...................................... 73/228 |
| 4,354,622 | 10/1982 | Wood ................................... 73/861.73 |

FOREIGN PATENT DOCUMENTS

| 0 786 648 A1 | 7/1997 | European Pat. Off. .......... G01F 1/30 |
| 60-122324 | 6/1985 | Japan . |
| 63-195524 | 8/1988 | Japan . |
| WO 81/00312 | 2/1981 | WIPO . |
| WO 89/11082 | 11/1989 | WIPO ............................... G01F 1/30 |
| WO 93/16356 | 8/1993 | WIPO ............................... G01F 1/30 |
| WO 93/22633 | 11/1993 | WIPO ............................ G01G 11/04 |
| WO 93/22652 | 11/1993 | WIPO . |

*Primary Examiner*—Harshad Patel
*Attorney, Agent, or Firm*—Darby & Darby

[57] ABSTRACT

An impact type flow meter for a particulate material such as cereal comprises a supply device for dropping the particulate material, an inclined load detection plate for receiving the dropped particulate material, and a load detector for detecting a load of the particulate material exerted to the load detection plate. A bottom surface of the supply device is inclined at substantially the same degree with the load detection plate, and has at its lower end with a supply opening for dropping the particulate material onto the load detection plate. The bottom surface serves to guide the particulate material to the load detection plate at substantially the same inclination therewith. Thus, the flow meter has a buffer device for softening a dropping impact of the particulate material integrally incorporated in the particulate material supply device, and accordingly, the height is low and the whole apparatus is compact. The particulate material impinges upon the bottom surface of the supply device, diverges widthwise thereof and reaches the supply opening. Accordingly, the direction and position of dropping of the particulate material onto the load detection plate are fixed. Further, the flow-down speed of the particulate material is lessened, unevenness of the speed is averaged or uniformed, thereby the flow meter is high in measurement accuracy.

8 Claims, 5 Drawing Sheets

IMPACT TYPE FLOW METER WITH TROUGH-LIKE MATERIAL SUPPLY DEVICE HAVING A BUILT IN SUPPLY OPENING

BACKGROUND OF THE INVENTION

The present invention relates to an impact type flow meter for measuring and controlling a flow rate of a particulate material such as cereal, and in particular to a flow meter utilizing a slanting or inclined detection plate.

The term "particulate material" used herein means not only a granular or particulate material but also a powdery or pulverulent material.

A conventional impact type flow meter is so constructed as to cause particulate material to drop onto an impact plate or detection plate and to calculate a flow rate thereof from its impact force. The detection plate is mounted with an inclination or descent so that the particulate material impinging thereupon can slide down at once with no stagnation. Such a flow meter is seen in, for example, U.S. Pat. No. 3,611,803, Japanese Patent Application Laid-Open Publication No. 60-122324, International Application Publication Nos. WO81/00312 and WO93/22652.

It has also been known to, instead of dropping particulate material directly onto the detection plate from a vertically above position, guide the same along inclined chutes to the detection plate. Such a flow meter is seen in International Application Publication No. WO93/22633 and Japanese Patent Publication No. H8-12091

FIG. 8 shows the arrangement proposed by Japanese Patent Publication No. H8-12091. The arrangement is such that one or more inclined buffer plates are provided between a discharge opening 103 in the lower portion of a particulate material supply device 102, which is below a hopper 101, and a detection plate 104. The particulate material dropping from the supply device 102 impinges upon the first one of the buffer plates, then slides down along the subsequent buffer plates, slides along the last buffer plate 105, and is finally dropped onto the detection plate 104. FIG. 8 illustrates only the final buffer plate 105 which is inclined in the same direction with the detection plate 104. The detection plate 104 is installed with its upper end located right below the lower end of the final buffer plate 105, and it has a detecting system or load cell 100 for detecting the vertical component of a force exerted to the detection plate 104.

The flow meter thus constructed functions as follows. (1) Thanks to the provision of the buffer plate 105, the particulate material is substantially constant in its position of dropping, indicated by an arrow 106, and direction of dropping, indicated by an arrow 107, with respect to the detection plate 104, even though the flow rate varies. That is, unevenness of the speed of the particulate material dropped from the supply device 102 is uniform. (2) The buffer plate 105 and the detection plate 104 have only a small difference between their inclining angles. Accordingly, the particulate material impinges onto the detection plate 104 with less impact, and then moves while it slides on the detection plate 104. When setting the inclining angle θD of the detection plate 104 less than the inclining angle θB of the buffer plate 105, a quasi-static force can be applied to the detection plate 104 according as the particulate material is moving thereon.

By the way, many conventional impact type flow meters use a cut-gate type particulate material supply device as shown in FIG. 9. The supply device is provided in its lower portion with a cut-gate 102 and opens and closes the discharge opening through rotary movement of the cut-gate. Therefore, there are caused a part A in which the material tends to stagnate, and a part C in which the material smoothly flows, depending on a degree of opening of the cut-gate 102. A boundary layer B is formed between the part A and the part C, and the thickness of the boundary layer B varies with the opening degree of the cut-gate 102. Change in the thickness of the boundary layer B causes the angle of repose of the stagnating part A to vary and provides a possibility that the stagnating part A will crumble at once. Thus, with the supply device of this type, the opening degree of the cut-gate 102 does not always coincide with the flow rate of the material, and there are cases where the accuracy in measuring the flow rate of the material is subject to detrimental affection.

Further, the flow meter shown in FIG. 8, because of its construction in which the plurality of buffer plates are arranged in a stair-like manner and the load cell 100 is situated below the detection plate 104, is large in the height h of the apparatus, thereby becoming large in its overall size.

SUMMARY OF THE INVENTION

The present invention has an object of, in view of the above-mentioned problems, providing an impact type flow meter which is small in height and compact and which is high in the accuracy of measurement of a flow rate.

Another object of the invention is to provide an impact type flow meter which can always make the opening degree of a particulate material supply device coincident with the conveying flow rate of particulate material to improve the accuracy of flow rate measurement.

The impact type flow meter for particulate material according to the invention comprises a supply device having a supply opening for dropping the particulate material, which can change the flow rate of the particulate material flowing through the supply opening, an inclined load detection plate provided at a position for receiving a load of the particulate material dropping from the supply device, a load detector for detecting the load of the particulate material exerted on the load detection plate and for converting the load into an electrical signal, and a computing device for computing the flow rate of the particulate material from the electrical signal delivered from the load detector. The supply device is in a trough-like shape defining a passage for the particulate material, and has a flat bottom surface of substantially the same inclination with the detection plate, and the supply opening is provided in the lower end of the bottom surface as viewed in the direction of inclination.

With the above arrangement, the inclined bottom surface of the supply device guides the particulate material at substantially the same inclination with the load detection plate, and accordingly, serves as the conventional buffer plate which has been described above. Thus, the flow meter is of the construction that the particulate material supply device is integrally incorporated with the buffer plate, and it is possible to reduce the height and make the whole apparatus compact. The particulate material flowing into the supply device always impinges on the bottom surface, diverges in the widthwise direction of the bottom surface and reaches the supply opening. Accordingly, the direction and position of dropping of the particulate material onto the load detection plate come to be constant or fixed. Even though the speed of the particulate material flowing into the supply device is uneven, at the time when flowing down through the supply opening, the flow-down speed has been reduced, so that the flow meter is high in the measurement accuracy.

The supply opening of the supply device is preferably rectangular and located close to the load detection plate so as to lessen the dropping impact of the particulate material. More specifically, it is preferable to set the space or distance between the supply opening and the load detection plate in such a manner that a quasi-static load on the inclined surface is detected to be larger than an impact load caused by dropping of the particulate material. The distance is, for example, about 40 mm for a flow meter which has the maximum measuring range of about 5 tons per hour. In this case, the flow meter can measure the particulate material in a manner like weighing measurement and is improved in the measurement accuracy. Incidentally, in order to improve the measurement accuracy of an impact type flow meter, it is desirable to calculate a flow rate based on a quasi-static load while eliminating an impact load.

Further, the flow meter is preferably provided with an opening and closing device for the supply opening of the supply device. The opening and closing device includes a plate member which is slidable in a direction parallel with the bottom surface so as to open and close the supply opening, and a drive source for moving the plate member. It is preferable for the plate member to be situated at a higher level than the supply opening with respect to the direction of inclination of the bottom surface, and to be moved downward for closing the supply opening. In this case, at whatever position the plate member lies, the particulate material by its all part slides down along the bottom surface and the plate member not to cause stagnation. Accordingly, the opening degree of the supply opening corresponds to the flow rate of the particulate material, and thereby the accuracy in measurement of a flow rate is further improved.

The plate member is preferably formed with a cut-out portion in the lower end edge thereof as viewed in the direction of inclination of the bottom surface. In this case, the plate member, even when being near its close position, can control the particulate material to the region of a small flow rate and does not cause the material to stagnate.

The load detector is preferably arranged at a height substantially equal to that of the supply device for particulate material to suspend the load detection plate. With this arrangement, it is possible to reduce the height of the apparatus and make the same compact as compared with the conventional flow meter in which the load detector is situated under the detection plate.

BRIEF DESCRIPTION OF THE DRAWINGS

The above and other features and advantages of the present invention will be more apparent from the description which will be made hereinbelow with reference to the accompanying drawings, in which.

DESCRIPTION OF THE PREFERRED EMBODIMENT

Description will be made on the impact type flow meter according to an embodiment of the invention with reference to the accompanying drawings.

Figure 1:
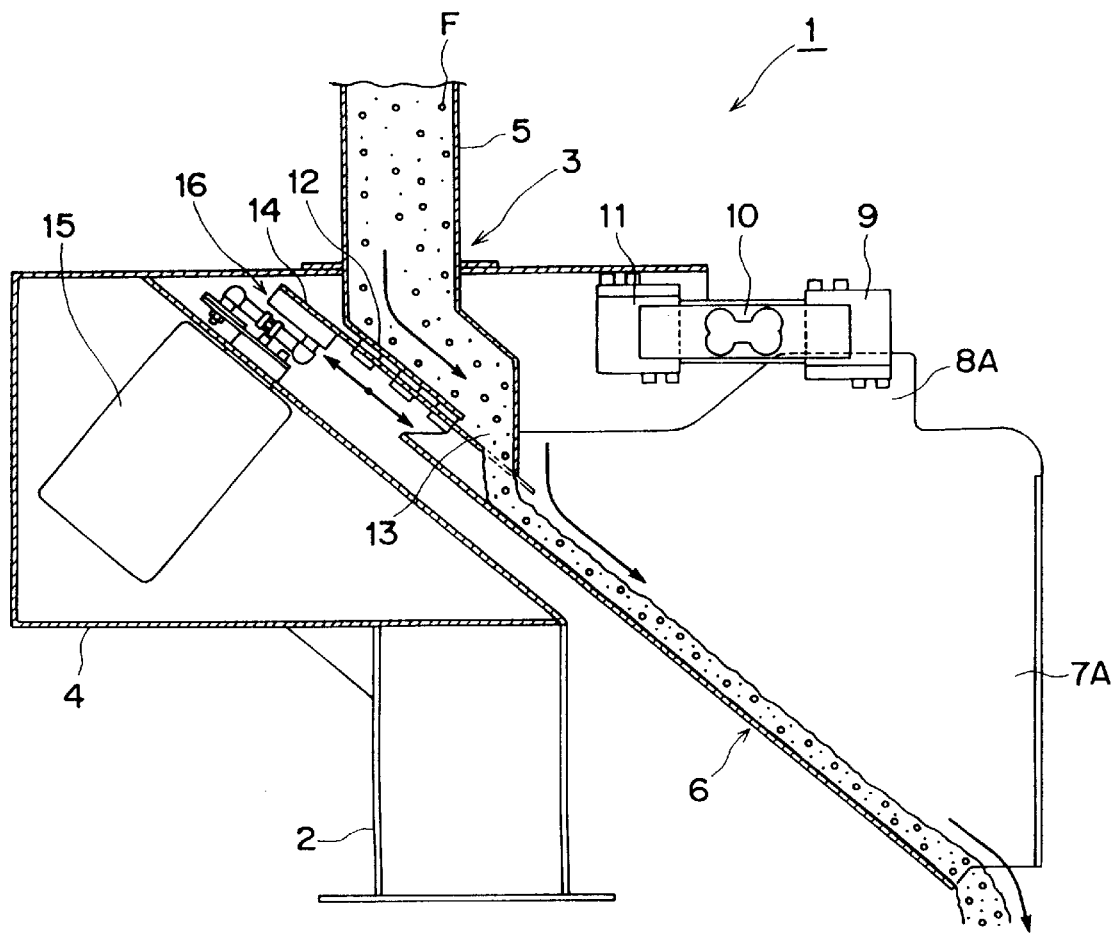
FIG. 1 is a longitudinal section view illustrating an essential part of the impact type flow meter according to an embodiment of the invention.
Figure 4:
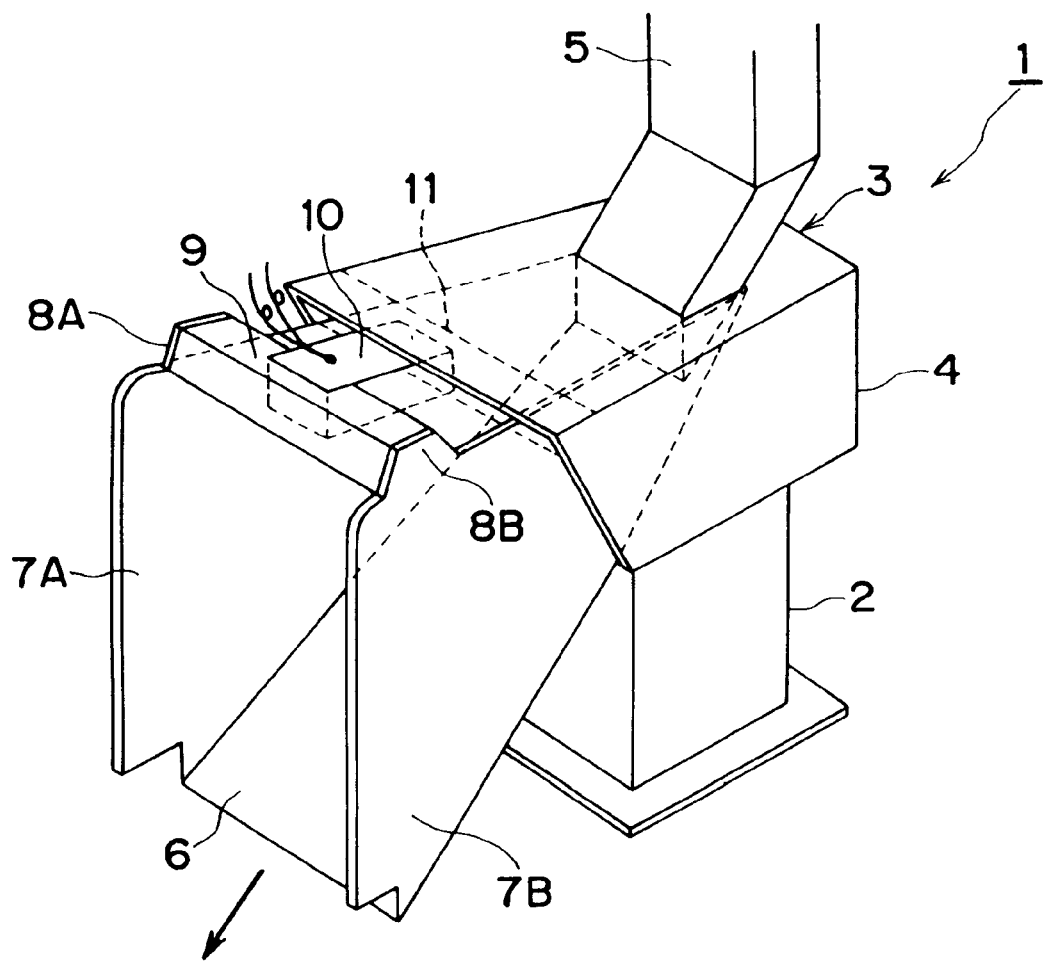
FIG. 4 is a perspective view illustrating the essential part of the flow meter of FIG. 1.

Referring to FIGS. 1 and 4 which show the essential part of the flow meter, the flow meter 1 has a machine base 2, and a machine frame 4 provided on the machine base 2 supports a particulate material supply device 3 and a load detection plate 6. The supply device 3, which can change the flow rate of a particulate material, is in a trough-like or pipe-like shape for defining a particulate material passage, and is situated in an upper part of the machine frame 4. The supply device 3 is connected with a reservoir hopper above the supply device, not shown in the figures, via a pipe-like member 5. The load detection plate 6 is positioned below the supply device 3 to receive a load of the particulate material F dropping from the supply device 3.

The load detection plate 6 is in a flat shape which is inclined with respect to the horizontal plane, so that the particulate material F slides along the inclined surface of the load detection plate 6 to exert a quasi-static load thereon. As shown in FIG. 4, support members 7A,7B of a substantially triangular shape are attached to widthwise opposite sides of the load detection plate 6, respectively. The support members 7A,7B are formed in their upper portions with grip parts 8A,8B, respectively, between which a support member 9 is spanned or bridged. A load cell 10 serving as a load detecting means is attached at one end thereof to the support member 9. The load cell 10 is supported at its other end by the machine frame 4 through a support member 11. Thus, the load cell 10 is configured to suspend the load detection plate 6 therefrom.

The particulate material supply device 3 has at its lower end a flat bottom surface 12, and the bottom surface 12 is inclined to a degree substantially equal to the load detection plate 6. The bottom surface 12 has, in its lower end as viewed in the direction inclination, a rectangular supply opening 13 of a constant width for dropping the particulate material F onto the load detection plate 6. With this arrangement, the particulate material F having flown into the particulate material supply device 3 diverges widthwise, as indicated by reference letter M in FIG. 6, while sliding along the bottom surface 12, and comes to the supply opening 13. The supply opening 13 is arranged preferably close to the load detection plate 6 so as to reduce the dropping shock or impact of the particulate material thereon. For example, in a case that the flow meter has a measuring range of about 5 tons per hour, the space or distance L between the supply opening 13 and the load detection plate 6 is set to 40 mm, see FIG. 2. The distance L is set in a manner that the quasi-static load of the particulate material F exerted on the inclined surface of the load detection plate 6, that is, a load close to that measured through weighing measurement, is larger than an impact load caused by dropping of the particulate material F. Further, the size of the supply opening 13 is set so that it can feed the particulate material at a desired maximum flow rate.

The particulate material supply device 3 is provided with an opening and closing device 16 for the supply opening 13.

The opening and closing device 16 is composed of a plate member 14 which is adapted to slide in parallel with the bottom surface 12 to open and close the supply opening 13, and a drive device 15 for moving the plate member 14, which is a control motor in this embodiment. Alternatively, the drive device 15 may comprise an air cylinder or the like which can stop at desired positions. The plate member 14 is located in a position higher than the supply opening 13, as viewed in the direction of inclination of the bottom surface 12, and is moved downward to close the supply opening 13.

Figure 2:
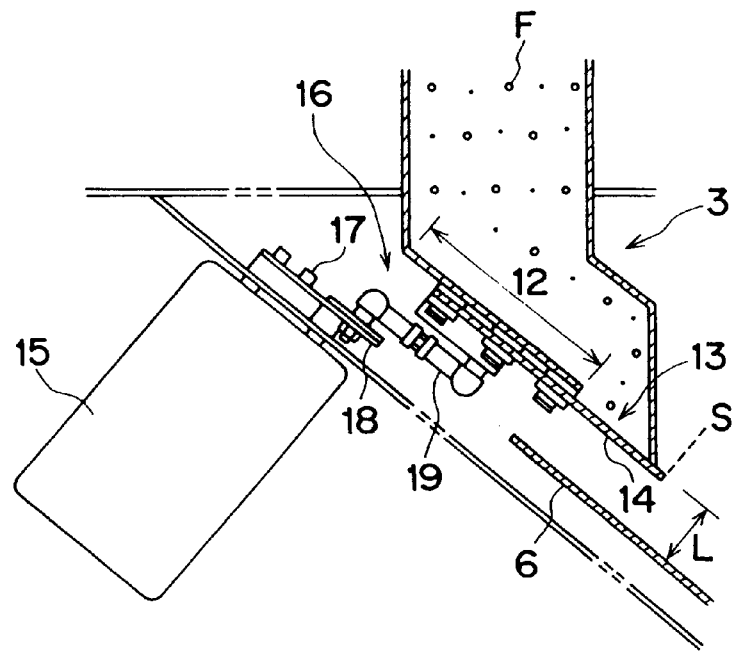
FIG. 2 is a section view of a particulate material supply device in the flow meter of FIG. 1, illustrating a state that an opening and closing device for the supply device is closed.
Figure 3:
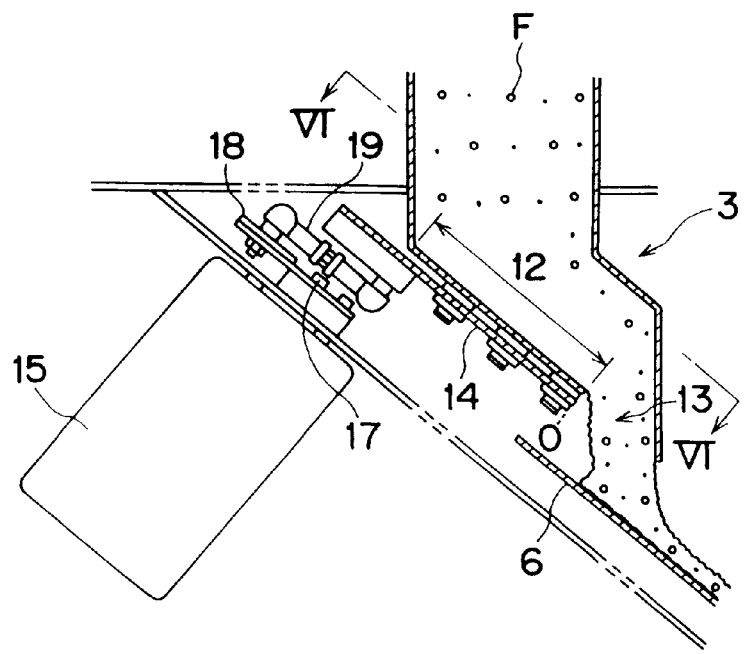
FIG. 3 is a section view showing the opening and closing device in its opened state.

The opening and closing device 16 moves the plate member 14 to a position S for closing the supply opening 13, see FIG. 2, to another position 0 for opening the supply opening 13, see FIG. 3, or to any position between these two positions to control the degree of opening of the particulate material supply device 3. More specifically, the control motor 15 is adapted to stop at any rotating angle, and has a motor shaft 17 attached thereto with a rotary plate 18. The rotary plate 18 is coupled to the plate member 14 through a drive arm 19. When the control motor 15 is rotated for a predetermined angle, the drive arm 19 is pulled up obliquely in the direction of inclination to open the supply opening 13, or to the contrary, the drive arm 19 is pulled down obliquely in the direction of inclination to close the supply opening 13.

Figure 5:
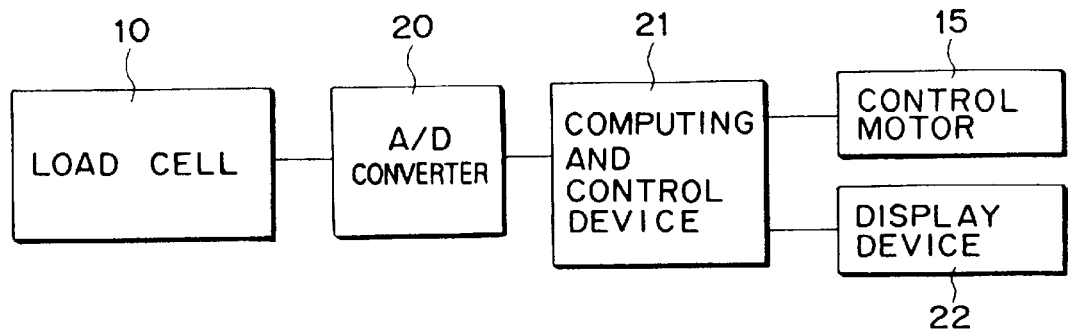
FIG. 5 is a block diagram illustrating a control section of the flow meter of FIG. 1.

The flow meter 1 has a control section, and FIG. 5 shows the control section. As described above, the load cell 10 serving as the load detector outputs an analog signal in accordance with a load exerted to the load detection plate by the particulate material, and is connected to a computing and controlling device 21, such as a microprocessor, through an A/D converter 20. The computing and controlling device 21, computes a flow rate of the particulate material going along the detection plate, on the basis of the input signal from the load cell 10. Connected to the computing and controlling device 21 are the control motor 15 for the particulate material supply device 3, and a display device 22 for indicating a flow rate as a result of the computation.

The operation of the flow meter 1 will be now described.

Before starting the operation of the flow meter 1, the particulate material supply device 3 closes its supply opening 13 as shown in FIG. 2, and is in a state of being filled with the particulate material F from the reservoir hopper. When the flow meter 1 is energized, the computing and controlling device 21 outputs a drive signal to the control motor 15. The control motor 15 rotates the rotary plate 18 for a predetermined angle and moves the plate member 14 upward in the direction of inclination through the drive arm 19 to open the supply opening 13. See FIG. 3. The particulate material F therefore flows downward along the bottom surface 12 of the supply device 3, and then drops from the supply opening 13, which is on the lower side as viewed in the inclination, onto the load detection plate 6.

Upon dropping of the particulate material F onto the load detection plate 6, the load cell 10 detects the load of the particulate material F, and delivers an analog signal in accordance with the result of detection. The analog signal is A/D-converted by the A/D converter 20, and is then introduced into the computing and controlling device 21. The computing and controlling device 21 computes a quasi-static load from the detection signal, and further converts the same into a flow rate with the use of a predetermined arithmetic formula. The computing and controlling device 21, when judging necessary from the result of computation, drives the control motor 15 for the opening and closing device 16 to adjust the opening degree of the plate member 14. Further, the flow rate calculated by the computing and controlling device 21 is indicated on the display device 22.

Figure 8:
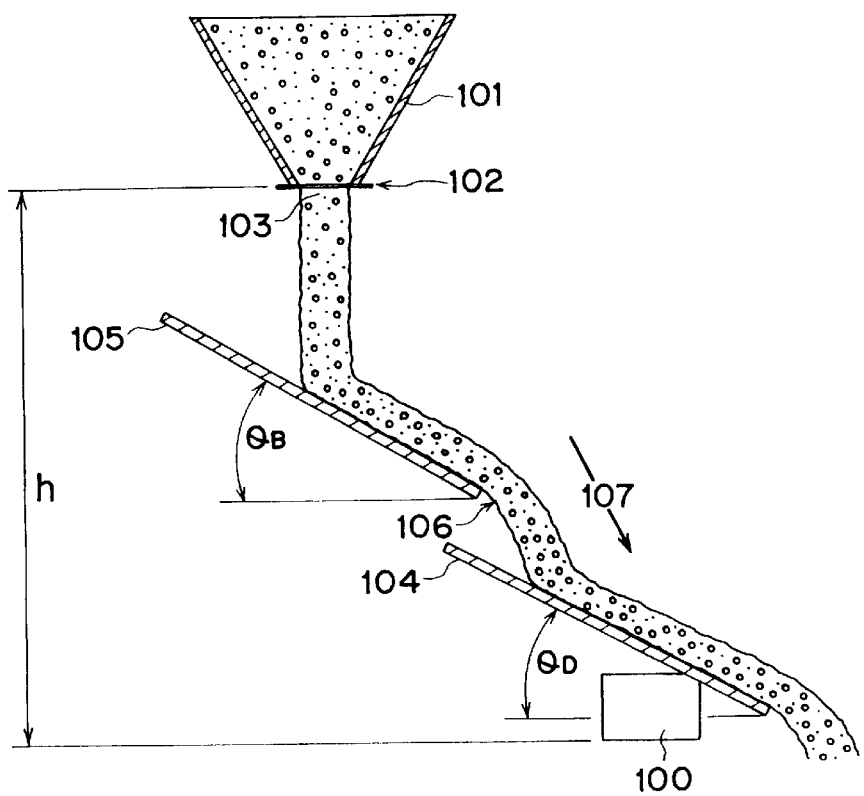
FIG. 8 is a schematic view illustrating the arrangement of a detection plate and a buffer plate in a conventional impact type flow meter.

The primary feature of the invention resides in the provision of the bottom surface 12, which is inclined to a degree similar to the load detection plate 6, in the lower portion of the particulate material supply device 3, as shown in FIG. 1, differently from the conventional example shown in FIG. 8, wherein the plurality of buffer plates are provided separately from the particulate material supply device 102. More specifically, the particulate material supply device and the buffer plate are integrally formed to simplify the construction, thereby making the height of the apparatus lower and the whole apparatus compact. In this supply device, the particulate material F flowing down from the pipe-like member 5 always impinges upon the bottom surface 12, diverges widthwise and reaches the supply opening 13. Accordingly, the direction and position of dropping of the particulate material F onto the load detection plate 6 are substantially fixed, and therefor, even though the speed of the particulate material flowing into the supply opening 13 is uneven, the flow-down speed is lessened and the unevenness of speed is averaged or uniformed when it flows out from the supply opening 13.

Further, as the particulate material supply device 3 has the supply opening 13 situated close to the load detection plate 6, the fall L between the supply opening 13 and the load detection plate 6, see FIG. 2, is small so as to be 40 mm. Accordingly, the dropping impact of the particulate material is less, and in the load exerted on the load detection plate 6, the quasistatic load caused when the particulate material F slides along the load detection plate 6 becomes larger in rate than the impact load upon dropping of the particulate material. It is thus possible to detect the flow rate of the particulate material F in a condition of almost weighing measurement.

Figure 9:
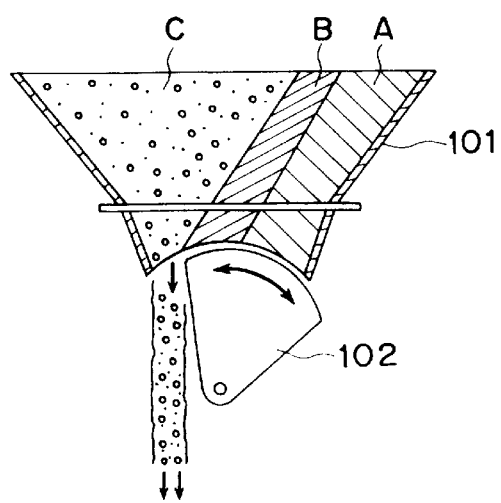
FIG. 9 is a section view of a particulate material supply device for use in conventional impact flow meters.

Moreover, the particulate material supply device 3 has the supply opening 13 in the bottom surface 12 on the lower side thereof as viewed in the inclination, and performs opening and closing of the supply opening 13 by means of the plate member 14 which slides in parallel with the bottom surface 12. The particulate material F in the supply device 3 flows down in its entirety into the supply opening 13 along the bottom surface part 12, and there is no possibility that the plate member 14 causes a stagnating part of the material due to its position, which corresponds to the part A shown in FIG. 9. Accordingly, the opening degree of the supply device 3 or the plate member 14 is consistent with the flow rate of the material, so that the accuracy in measuring the flow rate of the material is improved and the control of opening and closing of the supply opening 13 can also be carried out precisely. In addition, the distance between the supply opening 13 and the load detection plate 6 is fixed, and the distance of dripping of the particulate material F is constant wherever the plate member 14 lies. That is, the magnitude of the impact load exerted by the particulate material F is proportional to the opening degree of the plate member 14, and thereby conversion to the flow rate can be made with high accuracy. This will be explained with reference to FIG. 7.

Figure 7:
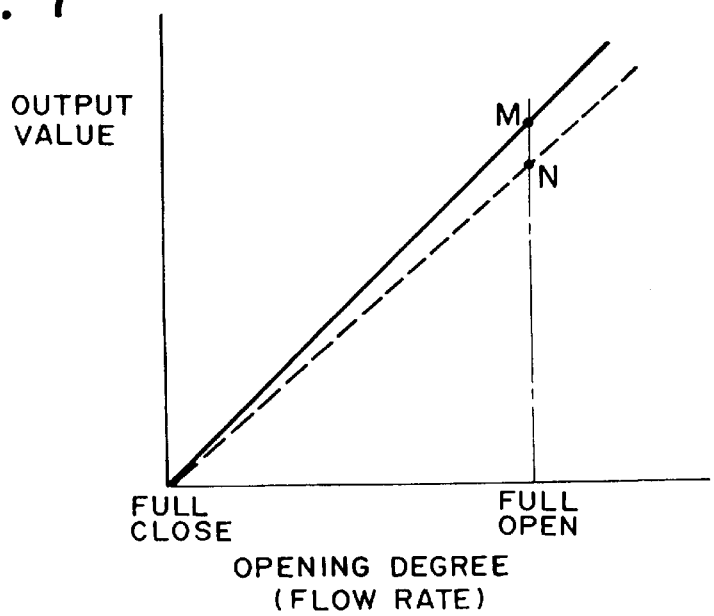
FIG. 7 is a graph showing the relationship between opening degrees of the opening and closing device and detection values by a load detector in the flow meter of FIG. 1.

FIG. 7 is a graph showing the relationship between opening degrees of the plate member 14 and detection values of the load cell 10, in which the abscissa denotes the opening degree and the ordinate denotes the detection value. The solid line M in FIG. 7 represents an actually detected value including the impact load which the load detection plate 6 receives due to the particulate material F dropping from the supply opening 13, and the quasi-static load of the particulate material F together. Since the impact load varies in proportion to the opening degree of the plate member 14, it is predicted that the quasi-static load will change as a broken line N with respect to the detection values of the solid line M. For instance, according to the graph of FIG. 7, the impact load can be obtained from M-N, and it will be appreciated that the impact load M-N is proportional to the opening degree of the plate member 14. Therefore, by calculating an impact load from, for instance, the flow rate at the maximum opening degree of the supply opening 13, the ration of impact load over all the region of opening of the supply opening can be predicted. Accordingly, when knowing an opening degree of the plate member 14, a predicted value of impact load is known, and calculation of a quasi-static load and conversion to a flow rate can be carried out with high accuracy.

Figure 6:
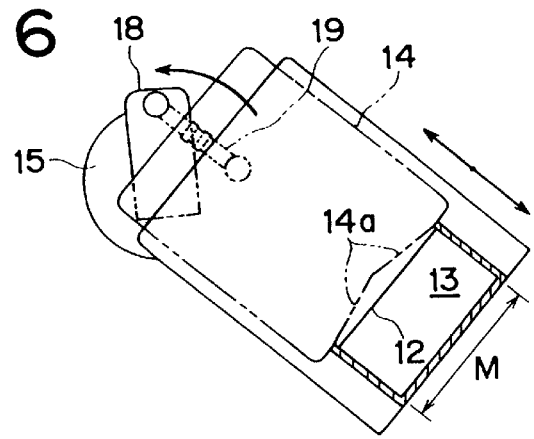
FIG. 6 is a plan view of the opening and closing device as viewed along the VI—VI line of FIG. 3.

Meanwhile, the plate member 14 for opening and closing the supply opening 13 is preferably formed, as shown in FIG. 6, in its leading end edge, that is, in the lower end edge as viewed in the direction of inclination of the bottom surface 12, with a cut-out portion 14i a. The cut-out portion 14a is generally in a chevron shape which become larger in opening as it comes near the widthwise center of the plate member 14. In an example of dimensions of the cut-out portion, an opening width is about 100 mm and the maximum height or depth of the chevron shape at its center is about 10 mm for the plate member 14 of a 130 mm width. The cut-out portion 14a, however, may take another shape than that described above and have other dimensions depending on the volume to be handled.

In the case that the cut-out portion 14a is formed, the closing position of the plate member 14 is set to a position where the cut-out portion 14a passes over the supply opening 13. With this arrangement, the plate member 14, even when lying near its close position, can control the particulate material flow to the extent of a small flow rate and does not allow the same to stagnate.

In the embodiment, the load cell 10 as the load detector is situated at a height substantially equal to the particulate material supply device 3 and suspends the load detection plate 6. Accordingly, the height h of the flow meter 1 can be decreased to make the apparatus compact as compared with the conventional example of FIG. 8 wherein the load cell 100 is disposed below the detection plate 104.

Although the invention has been described with reference to the embodiment, the invention is not limited solely to such a specific form, and the specific form may be modified variously, or the invention may take another form without departing from the scope of appended claims.

What is claimed is:

1. An impact type flow meter for a particulate material, comprising:

a supply device having an inclined flat bottom surface and a supply opening disposed proximate a lower end of said bottom surface as viewed in a direction of inclination for dropping the particulate material therethrough, said supply device being capable of changing a flow rate of the particulate material flowing through said supply opening, said supply device being arranged at a height relative to a base of said meter and having a substantially trough-like shape for defining a particulate material passage, the supply opening being defined by a plate member slidable in parallel with said bottom surface to close the supply opening, said plate member being substantially planar with said bottom surface when the supply opening is closed;

an inclined load detection plate disposed to receive a load of the particulate material dropping from said supply device, said bottom surface, supply opening, and load detection plate being at substantially the same inclination so that the particulate material flows at an inclination substantially the same as the inclination of said load detection plate to reduce a flowing-down speed of the particulate material and reduce a dropping impact of the particulate material onto said load detection plate;

a load detector detecting the load of the particulate material exerted to said load detection plate and converting the same into an electrical signal; and computing means for computing a flow rate of the particulate material based on the electrical signal from said load detector.

2. A flow meter according to claim 1, wherein said supply opening of said supply device is rectangular and is positioned close to said load detection plate to reduce a dropping impact of the particulate material.

3. A flow meter according to claim 2, wherein a distance between said supply opening of said supply device and said load detection plate is about 40 mm.

4. A flow meter according to claim 1, further comprising an opening and closing device for said supply opening of said supply device, said opening and closing device including a plate member slidable in parallel with said bottom surface for opening and closing said supply opening, and drive means for moving said plate member.

5. A flow meter according to claim 4, wherein when the supply opening is open, said plate member is disposed upstream of said supply opening as viewed in a direction of inclination of said bottom surface and is moved downward to close said supply opening.

6. A flow meter according to claim 4, wherein said plate member is formed with a cut-out portion in a lower end edge thereof as viewed in a direction of inclination of said bottom surface.

7. A flow meter according to claim 8, wherein said load detector is arranged at a height substantially equal to the height of said supply device and suspends said load detection plate.

8. An impact type flow meter for a particulate material, comprising:

a supply device having a supply opening for dropping the particulate material therethrough, said supply device being capable of changing a flow rate of the particulate material flowing through said supply opening, said supply device having a substantially trough-like shape for defining a particulate material passage and an inclined flat bottom surface, the supply opening being disposed proximate a lower end of said bottom surface as viewed in a direction of inclination thereof;

a plate member slidable in parallel with said bottom surface to close the supply opening, said plate member being substantially planar with said bottom surface when the supply opening is closed;

an inclined load detection plate disposed to receive a load of the particulate material dropping from said supply device, said bottom surface, plate member, and load detection plate being at substantially the same inclination;

a load detector detecting the load of the particulate material exerted to said load detection plate and converting the same into an electrical signal; and computing means for computing a flow rate of the particulate material based on the electrical signal from said load detector.

* * * * *